United States Patent
Tao et al.

(10) Patent No.: US 8,952,659 B2
(45) Date of Patent: Feb. 10, 2015

(54) DESKTOP CHARGER FOR HANDHELD COMMUNICATION DEVICE

(75) Inventors: Di Tao, Toronto (CA); Todd Andrew Wood, Guelph (CA)

(73) Assignee: BlackBerry Limited, Waterloo (CA)

( * ) Notice: Subject to any disclaimer, the term of this patent is extended or adjusted under 35 U.S.C. 154(b) by 548 days.

(21) Appl. No.: 12/779,568

(22) Filed: May 13, 2010

(65) Prior Publication Data

US 2011/0279084 A1 Nov. 17, 2011

(51) Int. Cl.
*H02J 7/00* (2006.01)
*H04M 1/04* (2006.01)

(52) U.S. Cl.
CPC ............. *H02J 7/0044* (2013.01); *H04M 1/04* (2013.01)
USPC ........................................................ 320/114

(58) Field of Classification Search
USPC .................. 320/107, 114; 439/529, 527, 620
See application file for complete search history.

(56) References Cited

U.S. PATENT DOCUMENTS

| | | | | |
|---|---|---|---|---|
| 5,275,885 | A * | 1/1994 | Ogura | 428/383 |
| 6,157,163 | A | 12/2000 | Blackwood | |
| 6,161,894 | A * | 12/2000 | Chapman | 296/155 |
| 6,438,229 | B1 | 8/2002 | Overy et al. | |
| 2005/0213298 | A1 | 9/2005 | Doherty et al. | |
| 2006/0238164 | A1 | 10/2006 | Rosal et al. | |
| 2008/0019082 | A1 | 1/2008 | Krieger et al. | |
| 2009/0009936 | A1 * | 1/2009 | Neu et al. | 361/679 |

FOREIGN PATENT DOCUMENTS

| | | |
|---|---|---|
| DE | 920947 U1 | 1/1993 |
| FR | 2885272 A3 | 11/2006 |

OTHER PUBLICATIONS

Krasser, Bernhard; Search report from corresponding European Application No. 10162789.1; search completed Jul. 14, 2010.
Images of Boynq D'Light USB Lamp; taken from http://the-gadgeteer.com/2007/12/07/boyng_d_light_usb_lamp/ at least as early as Jun. 17, 2009.
Images of Lamp with Flexible Gooseneck Head; taken from http://www.healthgoods.com/shopping/conservation_products/Lumiram_Full_Spectrum_Desk_Lamp.asp at least as early as Jun. 17, 2009.
Images of Standard Desktop Chargers / Cradles; taken from http://www.geardiary.com/2008/11/21/blackberry-bold-oem-desktop-charger/ at least as early as Jun. 17, 2009.

* cited by examiner

*Primary Examiner* — Arun Williams
(74) *Attorney, Agent, or Firm* — Brett J. Slaney; Blake, Cassels & Graydon LLP

(57) ABSTRACT

A charger device for use with a handheld communication device, the charger device comprises a cable, a connector element and a support element affixed to the connector element. The connector element includes a connector for engagement with a port of the handheld communication device. The support element is configured to support the handheld communication device in either one of a portrait orientation and a landscape orientation, when the connector is engaged with the port of the handheld communication device.

26 Claims, 5 Drawing Sheets

DESKTOP CHARGER FOR HANDHELD COMMUNICATION DEVICE

TECHNICAL FIELD

The following relates to devices for charging and supporting a handheld communication device.

BACKGROUND

It is well known to use a charger device to recharge the battery of a cable to connect a handheld communication device, such as a portable mobile device (e.g. a hand-held smart phone). In some cases, the charger device is provided as a simple cable assembly of the type illustrated in FIG. 1a. In this case, charger device 2 comprises a cable 6 terminated at one end with a standard plug connector 8 (such as a Universal Serial Bus (USB) or mini-USB, for example) designed to engage a port 10 of the handheld communication device 4. An opposite end of the cable is terminated at a power source (not shown). In some cases, the power source may be a small transformer unit which may be plugged into a wall outlet to provide electrical power to the handheld communication device. In other cases, the power source may be a connector designed to engage a port of a computer, such as a desktop Personal Computer (PC), in which case the charger device 2 may be used to provide both electrical power and a data connection between the handheld communication device 4 and the PC.

FIG. 1b illustrates an alternative arrangement, in which the connector is integrated into a "docking station" 12 which, in addition to providing a connector for electrical power and optionally a data connection, also serves to support the handheld communication device 4 in a position that makes it possible to read a screen 14 of the handheld communication device 4.

The foregoing arrangements suffer limitations in that the use of the simple cable of FIG. 1a does not afford any means of supporting the hand-held device in a convenient orientation, whereas the docking station of FIG. 1b can support the hand-held device in a readable orientation, but its size is inconvenient and limits its portability.

BRIEF DESCRIPTION OF THE DRAWINGS

Embodiments will now be described by way of example only with reference to the appended drawings wherein.

It will be noted that throughout the appended drawings, like features are identified by like reference numerals.

DETAILED DESCRIPTION

It will be appreciated that for simplicity and clarity of illustration, well-known methods, procedures and components have not been described in detail so as not to obscure the embodiments described herein. Also, the examples provided in the description are for illustrative purposes only.

Figure 1A:
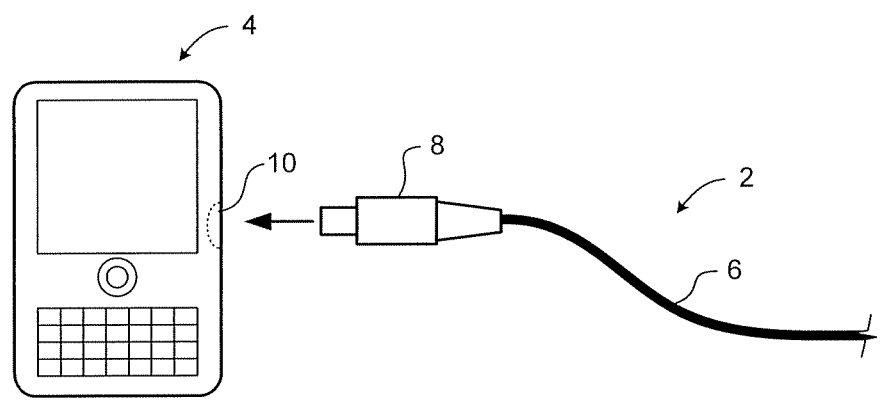
FIGS. 1a and 1b illustrate respective handheld charging devices known in the art.
Figure 1B:
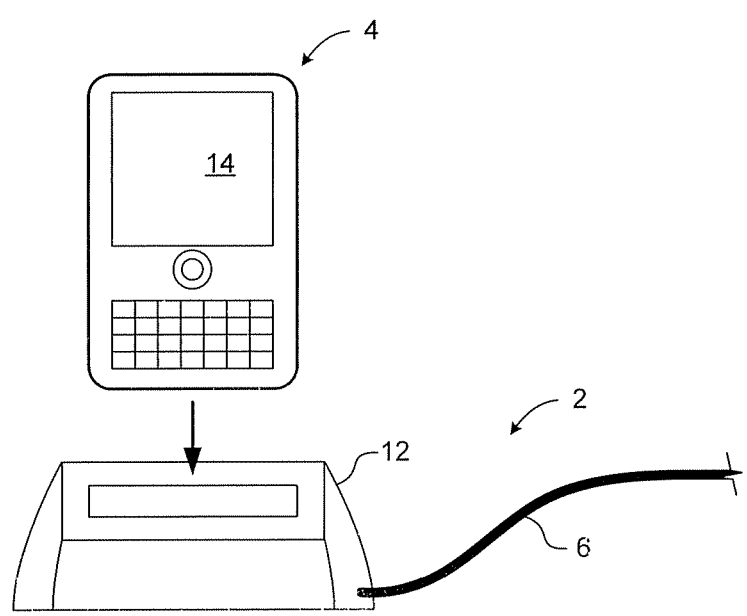
Figure 2A:
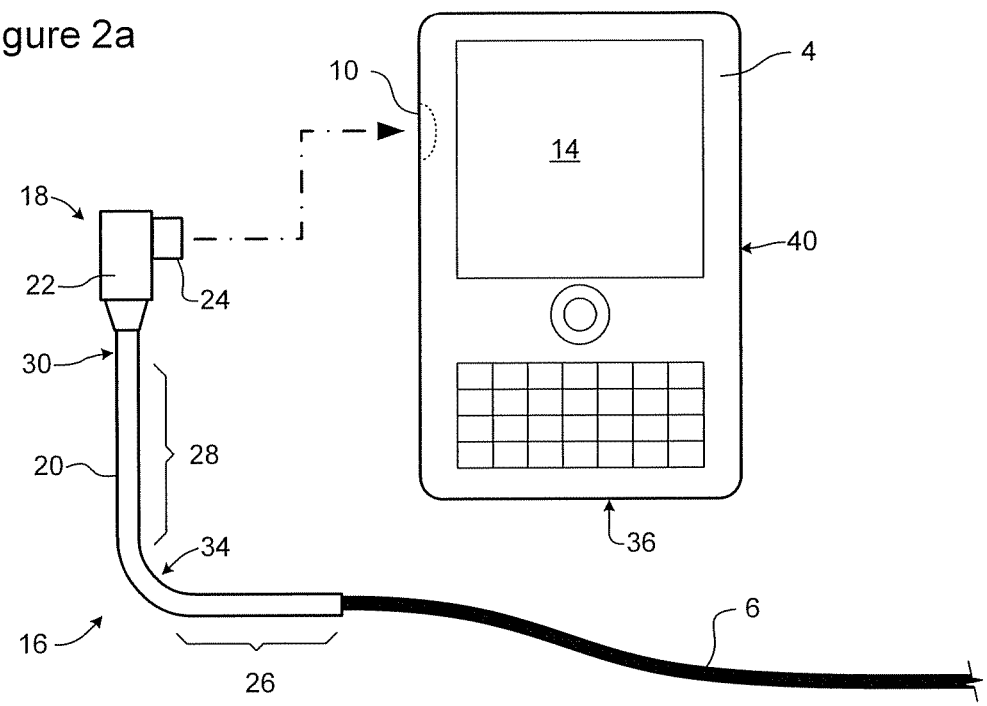
FIGS. 2a and 2b illustrate a charging device.
Figure 2B:
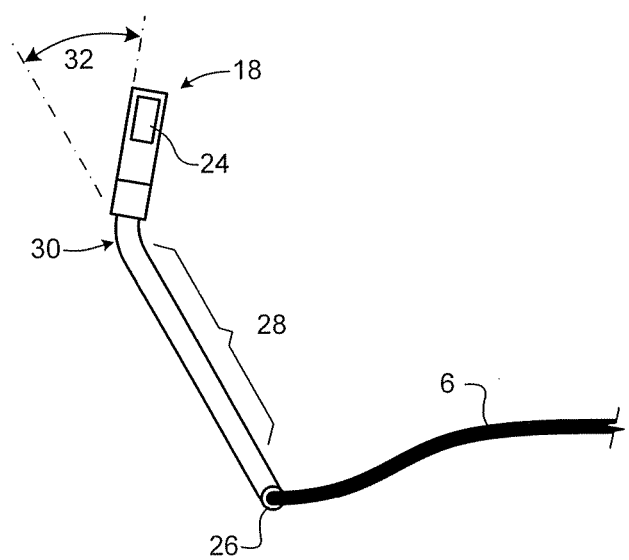

Referring to FIGS. 2a and 2b, there is shown a charging device 16 for a handheld communication device 4, such as for example, a mobile phone. In the embodiment of FIG. 2, the charging device 16 comprises a cable 6, a connector element 18 and a support member 20.

In preferred embodiments, the cable 6 is provided as a conventional flexible cable of a type commonly used for connecting a handheld communication device to a source of electrical power. Accordingly, a free end of the cable (not shown), may terminate with any desired type of termination device, including, but not limited to: a wall plug for connection to a standard wall outlet; or a device plug for connection to a standard port (e.g. a Universal Serial Bus (USB) or mini-USB port) of a computer. In cables terminated by a wall plug, the cable may be limited to a single pair of electrical conductors, and the wall plug may include a transformer or other means for reducing mains power to a Direct Current (DC) voltage having current and voltage values appropriate for charging the battery of the handheld communication device. In cables terminated by a device plug, the cable may include multiple electrical conductors to enable exchange of data between the handheld communication device and the computer, in additional to a pair of electrical conductors for providing DC current to the handheld communication device for charging the battery of the handheld communication device The connector element 18 preferably comprises a substantially rigid body 22 and a standard plug-type connector 24 designed to engage a standard port 10 (e.g. a USB or mini-USB port) provided on a side of the handheld communication device 4. The plug-type connector 24 includes contacts that are electrically connected to conductors of the cable 6 in a conventional manner. The body 22 may be formed of a plastic material, and serves to mechanically secure the connector 24 to an end of the support member 20, while maintaining a predetermined orientation of the connector 24 relative to the support member 20.

The support member 20 is a substantially rigid structure extending from the connector element 18. In preferred embodiments, the support member 20 is a hollow tubular structure, and has an interior diameter sized to receive the cable 6. With this arrangement, the cable 6 can extend through the support member 20, which contributes to a neat appearance of the charging device 16. The support member 20 may be formed of any suitable material, including metals and plastics.

In the illustrated embodiments, the support member 20 is shaped to define relatively straight base and riser portions 26 and 28 respectively, and head end 30 which defines a desired angle 32 between the riser portion 28 and the connector 24.

The base and riser portions 26 and 28 are separated by a curved portion 34, the radius of which may be selected so as to be large enough to facilitate manufacture of the support member 20 and insertion of the cable 6 therethrough, while at the same time ensuring that the base portion 26 is approximately centered behind the handheld communication device 4 when the connector 24 is engaged with the port 10 on the side of the handheld communication device 4.

The length of the base and riser portions 26 and 28 may be selected as desired. Preferably, the length of the base portion 26 is selected such that, when the connector 24 is engaged with the port 10 on the side of the handheld communication device 4, the base portion 26 will extend across less than the entire width of the handheld communication device 4. Preferably, the length of the riser portion 28 is selected such that a distance between the connector 24 and the base portion 26 is approximately equal to a distance between the port 10 on the side of the handheld communication device 4 and an end 36 of the handheld communication device 4.

The head end 30 may define any desired angle 32 between the riser portion 28 and the connector 24. The angle 32 is preferably selected such that, when the connector 24 is engaged with the port 10 on the side of the handheld communication device 4, the base portion 28 extends parallel to the end 26 of the handheld communication device 4 and separated therefrom by a desired distance. In some embodiments, an angle of about 30° is satisfactory, but other angles may equally be used, as desired.

Figure 3A:
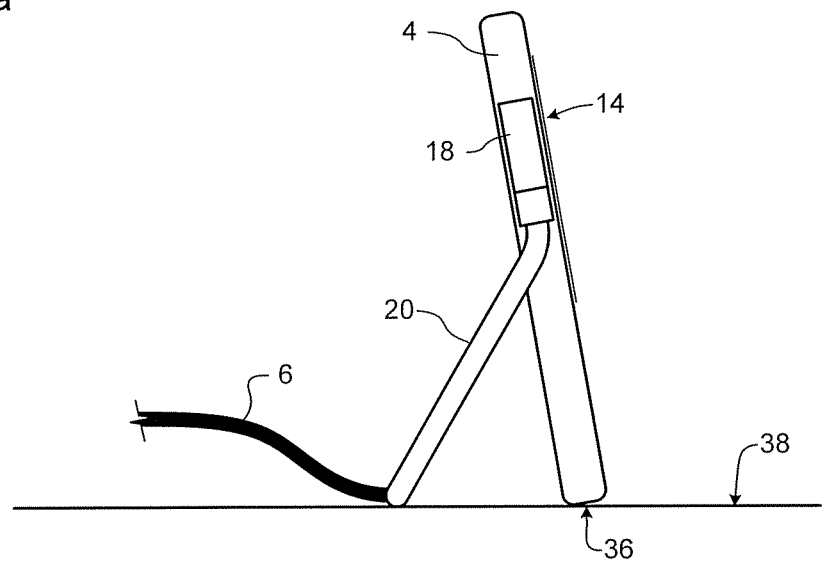
FIGS. 3a and 3b illustrate use of the charging device of FIG. 2 to support a handheld communication device in a portrait orientation.
Figure 3B:
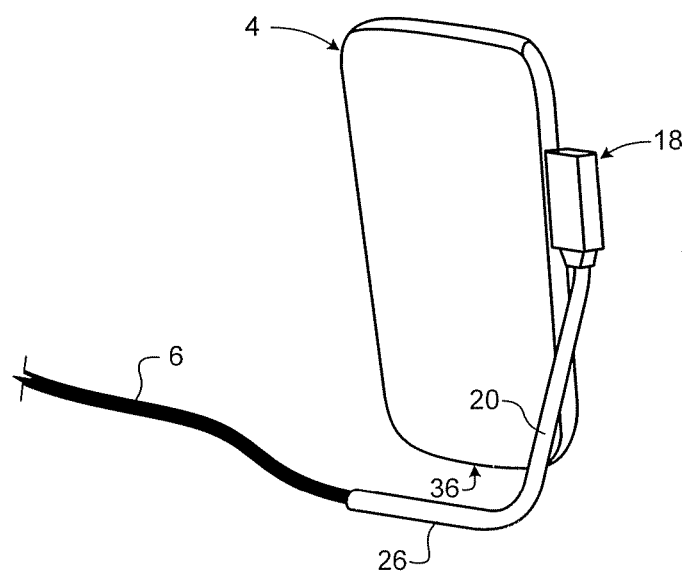

FIGS. 3a and 3b respectively show side and perspective views of the charging device 16 of FIGS. 2a and 2b, in use for supporting a handheld communication device 4 in a portrait orientation. As may be seen in FIG. 3a, when the connector 24 is engaged with the port 10 on the side of the handheld communication device 4, the connector 24 provides both an electrical connection between handheld communication device 4 and the cable 6, and a mechanical connection between the handheld communication device 4 and the connector body 22, and thus the support member 20. The handheld communication device 4 can thus be placed on a horizontal surface 38 (e.g. a desk or table), with the end 36 of the hand-held device 4 and the base portion 26 of the support member 20 resting on the surface 38. In this orientation, a display screen 14 of the handheld communication device 4 is held in a portrait orientation, and tilted upwards for easy viewing by a user. The mechanical strength and rigidity of the support member 20, connector element 18, and the port 10 in the side of the handheld communication device 4 are sufficient that the handheld communication device 4 can be securely supported in this position.

Figure 4A:
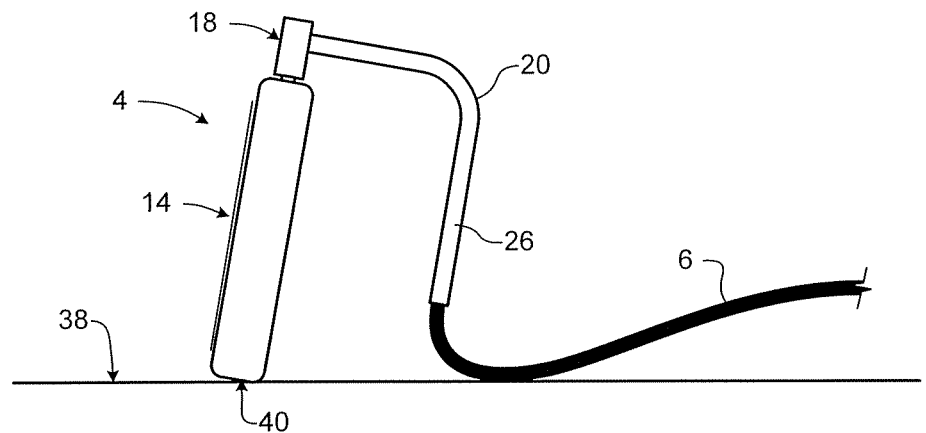
FIGS. 4a and 4b illustrate use of the charging device of FIG. 2 to support a handheld communication device in a landscape orientation.
Figure 4B:
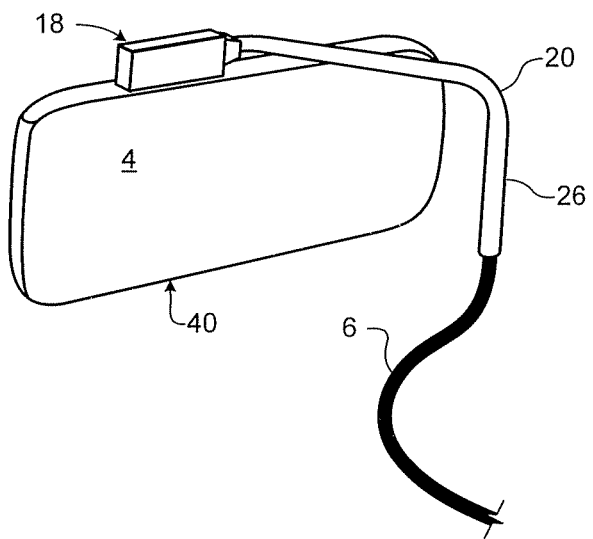

FIGS. 4a and 4b respectively show side and perspective views of the charging device 16 of FIGS. 2a and 2b, in use for supporting the handheld communication device 4 in a landscape orientation. As may be seen in FIG. 4a, the handheld communication device 4 can thus be placed on a horizontal surface 38 (e.g. a desk or table), with the side 40 of the handheld communication device 4 opposite that of the connector element 18 resting on the surface 38. In this case, the base portion 26 of the support member 20 is oriented approximately vertically, so that the cable 6 extends from the base portion 26 and projects towards the surface 38. Because the cable 6 is flexible, it can easily be turned to lay on the surface 38. However, the natural resilience of the cable 6 ensures that the cable 6 can contact the surface 38 and thereby stabilize the handheld communication device 4 to prevent its tipping over. Thus the handheld communication device 4 is supported with its display screen 14 held in the landscape orientation. The mechanical strength and rigidity of the support member 20, connector element 18, and the port 10 in the side of the handheld communication device 4 are sufficient that the handheld communication device 4 can be securely supported in this position.

Figure 5:
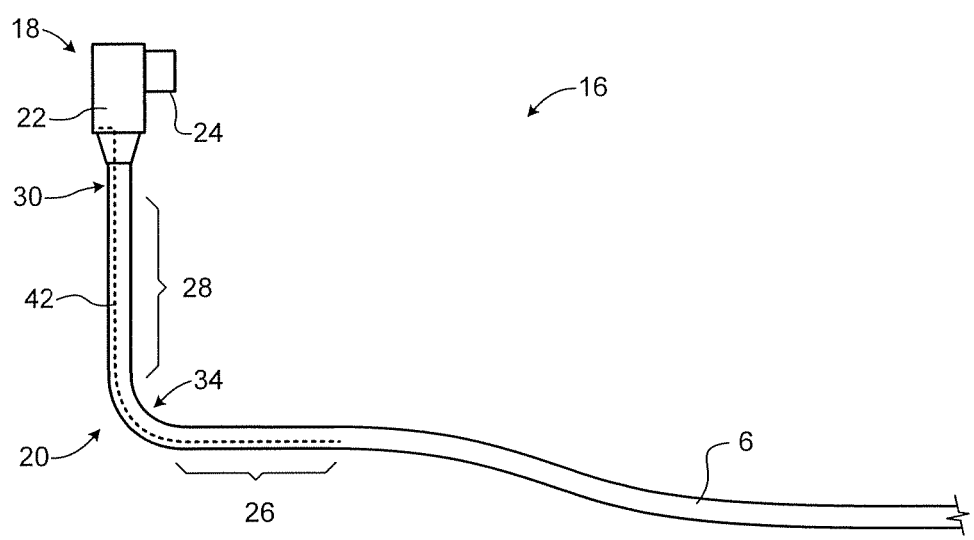
FIG. 5 illustrate an alternative embodiment of a charging device.

In the embodiments described above with reference to FIGS. 2-4, the support member 20 is provided as a substantially rigid hollow structure that surrounds the cable 6. However, it will be appreciated that this arrangement is not essential. In general, the support member 20 may be provided as any desired structure having suitable properties of strength and stiffness. For example, the support member 20 may be constructed by suitably stiffening a portion of the cable 6 extending from the connector element 18. In fact, the embodiment of FIG. 2 may be seen as an example of this approach, in which the cable is stiffened by means of a metal or plastic tube that surrounds the cable. FIG. 5 illustrates an alternative embodiment, in which the cable is stiffened by means of a stiffener element 42 that is incorporated within the cable, and secured to the connector element 18. If desired, the stiffener element 42 could equally be incorporated within a jacket of the cable, or secured to the outer surface of the cable (for example by means of suitable adhesives).

The stiffener element 42 may be formed of any desired material having suitable strength and stiffness, including metals or plastics. In some embodiments, the stiffener element 42 is substantially rigid, so that the cable is held in a fixed shape to define the support member 20. In other embodiments, the stiffener element 42 may be pliable, so that a user can bend support member 20 into any desired shape, which will then be maintained by the stiffener element 42. Thus, for example, a user may distort the shape of the support member 20 when "coiling-up" the cable 6 to facilitate transport of the charger device 16. When the user wishes to use the charger device 16, the proper shape of the support member 20 may be restored by straightening the base and riser portions 26 and 28, and manipulating the head portion 30 to define a desired angle between the riser portion 26 and the connector element 18. In some embodiments, restoration of the proper shape of the support member 20 can be facilitated by forming the stiffener element 42 of a shape memory alloy. In this case, the user may quickly and easily restore the support member 20 to its proper shape by applying heat to the cable near the connector element 18. Known shape memory alloys are commercially available with transition temperatures low enough that this operation can be safely performed by a user without risk of burning themselves or damaging the cable 6.

Although the above has been described with reference to certain specific embodiments, various modifications thereof will be apparent to those skilled in the art without departing from the scope of the claims appended hereto.

The invention claimed is:
1. A charging device comprising:
a conventional charger used with a handheld communication device, the conventional charger including: a connector for rigid engagement with a port of the handheld communication device; and a flexible cable extending from the connector to a termination device; and
a support comprising:
a connector element comprising a substantially rigid body and configured to contain the connector of the charger device for engagement with the port of the handheld communication device; and
a support member rigidly affixed to the connector element at a first end thereof to maintain a predetermined orientation of the connector element and the connector of the charger device relative to the support member, the support member providing a substantially rigid structure to provide support to the flexible cable of the charger device by comprising a stiffener element to affix to the flexible cable, the support member being configured to support the handheld communication device in a plurality of orientations through engagement of a portion thereof in a first orientation, and a portion of the flexible cable of the charger device protruding from a second end thereof in a second orientation, with an underlying surface.
2. The charging device of claim 1, wherein the support member comprises a base portion, a riser portion and a head end attached to the connector element, the head end being configured to define a predetermined angle between the riser portion and the connector element.

3. The charging device of claim 2, wherein the predetermined angle is selected such that, when the connector of the charger device is engaged with the port of the handheld communication device, the base portion extends parallel to an end of the handheld communication device and separated therefrom by a desired distance.

4. The charging device of claim 2, wherein the predetermined angle is 30°.

5. The charging device of claim 2, wherein a length of the riser portion is selected such that a distance between the connector of the charger device and the base portion is similar to a distance between the port of the handheld communication device and an end of the handheld communication device.

6. The charging device of claim 2, wherein a length of the base portion is selected such that, when the connector of the charger device is engaged with the port of the handheld communication device, the base portion extends across less than an entire width of the handheld communication device.

7. The charging device of claim 1, wherein the support member comprises a hollow tubular structure, an inner diameter of the hollow tubular structure being sized to receive the cable.

8. The charging device of claim 1, wherein the stiffener element is incorporated within the support member.

9. The charging device of claim 1, wherein the stiffener element is affixed to an outer surface of the support member.

10. The charging device of claim 1, wherein the stiffener element is formed of a shape-memory alloy.

11. The charging device of claim 1, wherein the rigid body permits engagement of the connector of the charger device with the port of the handheld communication device without enclosing the handheld communication device.

12. A charger device comprising a connector for engagement with a port of a handheld communication device, a flexible cable extending from the connector to a termination device, and a removable support for the charger device, the removable support being detachable from the flexible cable and comprising:
a connector element comprising a substantially rigid body and configured to contain the connector of the charger device for engagement with the port of the handheld communication device; and
a support member rigidly affixed to the connector element at a first end thereof to maintain a predetermined orientation of the connector element and the connector of the charger device relative to the support member, the support member providing a substantially rigid structure to provide support to the flexible cable of the charger device by comprising a stiffener element affixed to the flexible cable, the support member being configured to support the handheld communication device in a plurality of orientations through engagement of a portion thereof in a first orientation, and a portion of the cable of the charger device protruding from a second end thereof in a second orientation, with an underlying surface.

13. The charger device of claim 12, wherein the support member comprises a base portion, a riser portion and a head end attached to the connector element, the head end being configured to define a predetermined angle between the riser portion and the connector element.

14. The charger device of claim 13, wherein the predetermined angle is selected such that, when the connector of the charger device is engaged with the port of the handheld communication device, the base portion extends parallel to the end of the handheld communication device and separated therefrom by a desired distance.

15. The charger device of claim 13, wherein the predetermined angle is 30°.

16. The charger device of claim 13, wherein a length of the riser portion is selected such that a distance between the connector of the charger device and the base portion is similar to a distance between the port of the handheld communication device and an end of the handheld communication device.

17. The charger device of claim 13, wherein a length of the base portion is selected such that, when the connector of the charger device is engaged with the port of the handheld communication device, the base portion extends across less than an entire width of the handheld communication device.

18. The charger device of claim 12, wherein the support member comprises a hollow tubular structure, an inner diameter of the hollow tubular structure being sized to receive the cable.

19. The charger device of claim 12, wherein the stiffener element is incorporated within the support member or the cable.

20. The charger device of claim 12, wherein the stiffener element is affixed to an outer surface of the support member or an outer surface of the cable.

21. The charger device of claim 12, wherein the stiffener element is formed of a shape-memory alloy.

22. The charger device of claim 12, wherein the rigid body permits engagement of the connector of the charger device with the port of the handheld communication device without enclosing the handheld communication device.

23. A charging device for a handheld communication device, the charging device comprising:
a connector element for engagement with a port of the handheld communication device;
a flexible cable extending from the connector element; and
a stiffener element attachable to a first portion of the flexible cable to define a support member along the flexible cable for supporting the handheld communication device when the charging device is connected thereto, the stiffener element comprising a base portion, a riser portion and a head end attached to the connector element, the head end being configured to define a predetermined angle between the riser portion and the connector element, the predetermined angle being selected such that, when the connector of the charger device is engaged with the port of the handheld communication device, the base portion extends parallel to an end of the handheld communication device and separated therefrom by a desired distance, a second portion of the flexible cable extending beyond the stiffener element to engage an underlying surface in one of a plurality of orientations.

24. The charging device of claim 23, wherein the stiffener element is incorporated into the cable and connected to the connector element.

25. The charging device of claim 24, wherein the stiffener element is incorporated into a jacket of the cable.

26. The charging device of claim 23, wherein the stiffener element is secured to an outer surface of the cable.

* * * * *